Feb. 19, 1957 — H. B. PERRINE — 2,782,015
EVAPORATIVE COOLER
Filed March 7, 1955 — 2 Sheets-Sheet 1
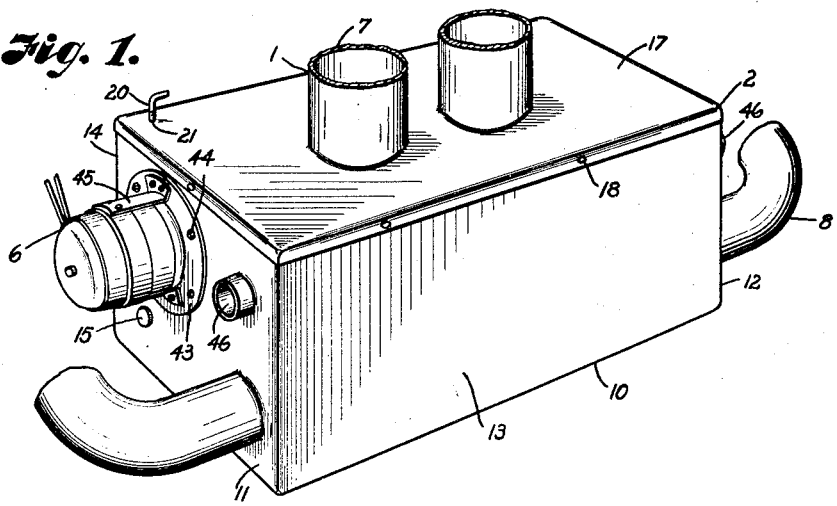
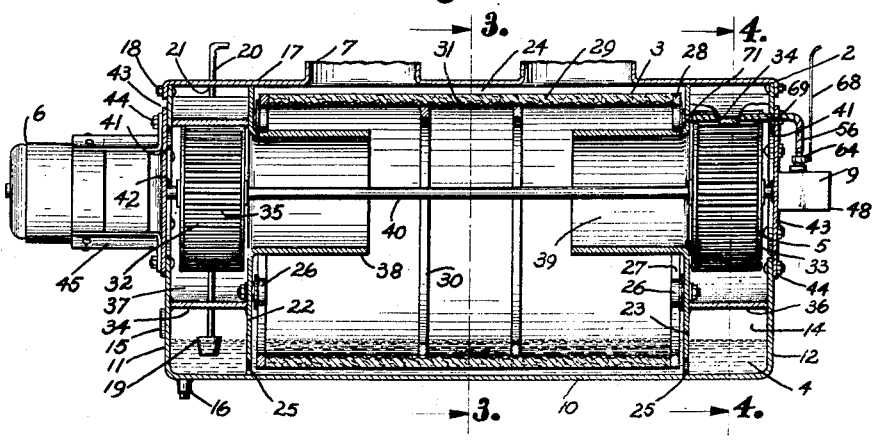
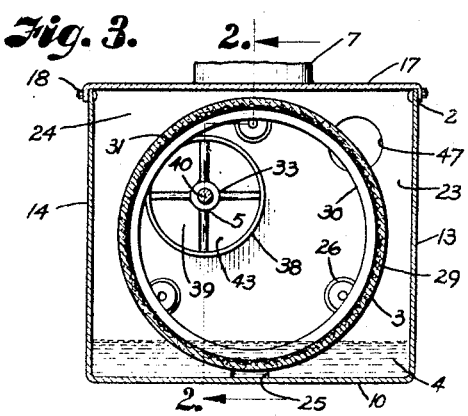
INVENTOR.
Herald B. Perrine.
BY
Fishburn & Mullendore
ATTORNEYS.

Feb. 19, 1957 — H. B. PERRINE — 2,782,015
EVAPORATIVE COOLER
Filed March 7, 1955 — 2 Sheets-Sheet 2
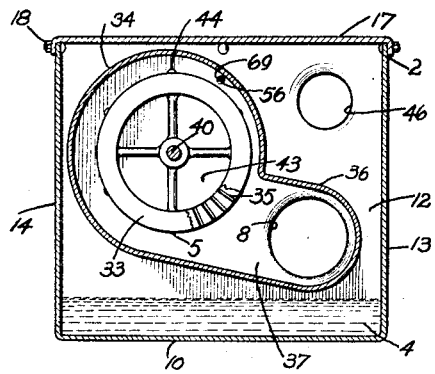
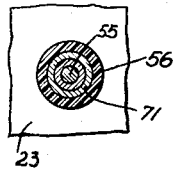
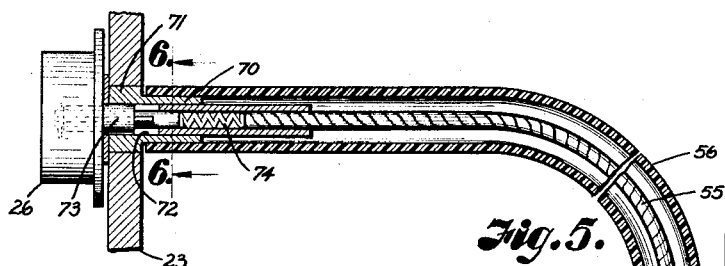
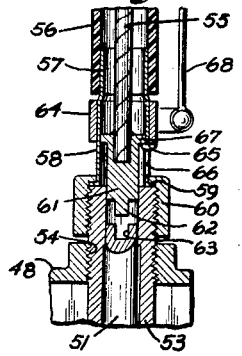
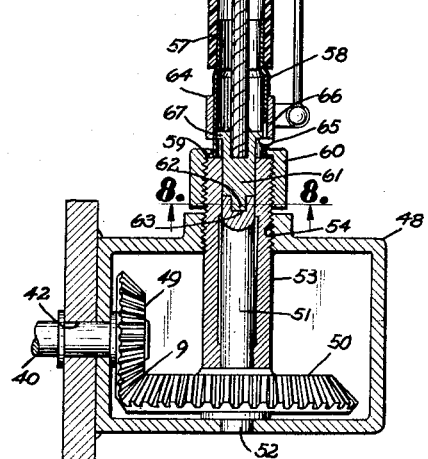
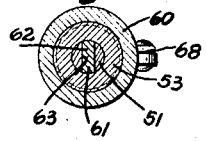
INVENTOR.
Herald B. Perrine.
BY
Fishburn + Mullendore
ATTORNEYS.

ically to evaporative coolers, and more particularly to an evaporative cooler apparatus and controls adapted to be used for circulating and cooling air in vehicle passenger compartments and the like.

United States Patent Office 2,782,015
Patented Feb. 19, 1957

2,782,015

EVAPORATIVE COOLER

Herald B. Perrine, El Cajon, Calif.

Application March 7, 1955, Serial No. 492,569

4 Claims. (Cl. 261—23)

This invention relates to evaporative coolers, and more particularly to an evaporative cooler apparatus and controls adapted to be used for circulating and cooling air in vehicle passenger compartments and the like.

The objects of the invention are to provide, an evaporative cooler unit adapted to be mounted in the trunk or other compartment of a vehicle and connected by ducts to the passenger compartment for circulating and cooling air therein; to provide such an evaporative cooler with a liquid sump and a rotative drum carrying an absorptive porous material having the lower portion thereof movable through the liquid; to provide such a cooler with air moving apparatus for moving air through the absorptive material above the liquid level whereby the air is cooled by evaporation of liquid in said material and the cool air discharged through a duct to the passenger compartment; to provide such a structure wherein the air moving means is operated to circulate air and the drum selectively controlled for rotation only when additional cooling and moisture is desired in the air delivered to the passenger compartment; to provide such apparatus wherein the air moving means and drum are driven by the same motor; and to provide an evaporative cooler unit that is economical to manufacture and efficient in operation for selective cooling and circulation of washed air to provide a comfortable condition in the compartment being cooled.

In accomplishing these and other objects of the present invention, I have provided improved details of structure, the preferred form of which is illustrated in the accompanying drawings wherein:

Fig. 1 is a perspective view of an evaporative cooler embodying the features of the present invention.

Fig. 2 is a longitudinal sectional view through the unit on the line 2—2, Fig. 3.

Fig. 3 is a transverse sectional view through the evaporative cooler unit on the line 3—3, Fig. 2.

Fig. 4 is a transverse sectional view through the evaporative cooler unit on the line 4—4, Fig. 2.

Fig. 5 is a vertical sectional view through the drum drive and clutch unit therefor.

Fig. 6 is a transverse sectional view through the drum drive on the line 6—6, Fig. 5.

Fig. 7 is a sectional view through the drum drive clutch with the parts thereof disengaged.

Fig. 8 is a transverse sectional view through the drum drive on the line 8—8, Fig. 5.

Referring more in detail to the drawings:

1 designates an evaporative cooler unit which generally includes a casing 2 enclosing a rotative drum 3 mounted in the casing with the lower portion of said drum extending into liquid 4 in the bottom portion of the casing and air moving means 5, such as blowers, driven by a motor 6 for drawing air through ducts 7 into the casing and discharging the air through ducts 8 to a compartment to be cooled, and drive mechanism 9 selectively operable for rotating the drum 3.

The casing 2 preferably has a bottom wall 10, end walls 11 and 12, and side walls 13 and 14, suitably connected to form an open top container adapted to have a suitable quantity of liquid such as water 4 in the lower portion thereof or suitable sump therein whereby the drum 3 can operate in the liquid as later described. The casing has a fill opening, as for example in the end wall 11, covered by a removable cap 15 and a drain connection 16 preferably in the bottom wall 10.

A cover 17 closes the open top of the container and is secured thereto by suitable fastening devices 18, said cover having openings therein communicating with the intake ducts 7 which lead to suitable locations in a passenger compartment of a vehicle or other compartment to be cooled whereby air may be drawn from said compartment into the casing 2.

A float 19 is mounted on the lower end of a rod 20 that extends through an aperture 21 in the cover 17 and is slidable therein whereby the rod indicates the level of liquid in the casing. Partitions 22 and 23 are arranged transversely of the casing and have a spacing longitudinally of the casing slightly longer than the length of the drum 3. The partitions 22 and 23 are preferably suitably secured as by welding to the side and bottom walls and have suitable engagement with the cover 17 to cooperate with the walls and cover to define a rotor chamber 24 between the partitions 22 and 23. The partitions are each preferably provided with openings 25 adjacent the bottom wall 10 for movement of the liquid 4 therethrough, said openings 25 being below the desired water level in the casing.

A plurality of flanged rollers 26 are arranged in the chamber 24 and rotatably mounted on the partitions 22 and 23 to support the drum 3. In the illustrated structure, three rollers are rotatably mounted on each partition and suitably spaced whereby said rollers engage the inside surface 27 of ring members 28 at each end of the drum 3. The drum consists of a cylindrical wall 29 of absorbent fibrous material formed into a porous mat. The wall 29 is suitably secured to and supported by the rings 28 and also the plurality of additional support rings 30 arranged intermediate the ends of the drum. A coarse wire mesh 31 or other suitable foraminous or open material extends between and is preferably connected to the rings 28 and 30 for supporting the fibrous material in the drum wall 29.

With this construction, the drum is of relatively light weight, cylindrical structure rotatably supported on the rollers 26 in the chamber 24 with the lower portion of the drum operable in the liquid 4 in the bottom portion of the casing, the drum being driven as later described to cause the absorbent pad-like wall 29 to move through the liquid for wetting the absorbent material of the wall and then have air move through the porous absorbent pad-like wall to be cooled by evaporation of the liquid as the drum is rotated.

The drum 3 has open ends and is slightly less in length than the spacing between the partitions 22 and 23 whereby there is operating clearance between the drum and the partitions. The air moving means 5 preferably consists of blowers arranged exteriorly of the chamber 24. In the illustrated structure the air moving means consists of two blowers 32 and 33 arranged between the wall 11 and partition 22 and the wall 12 and partition 23 respectively whereby said walls cooperate with walls 34 to define the housings for the impellers 35 of the blowers 32 and 33. Extensions 36 are connected to the walls 34 to define discharge ducts 37 communicating with the ducts 8. A tubular intake 38 for each blower is arranged on the partitions 22 and 23 and extends inwardly of the chamber 24 to define blower intake passages 39. Each of the tubular members 38 preferably extend into the chamber 24 for a distance substantially one-fourth the length of the drum 3. The impellers 35 are fixed on a shaft 40 preferably arranged substantially coaxially of the tubular members 38 and extending through apertures 41 in the walls 11 and 12. The shaft 40 is rotatably mounted in bearing openings 42 in cover plates 43 secured by suitable fastening devices 44 to the walls 11 and 12 to cover the apertures 41.

The motor 6 is supported by brackets 45 fixed on the cover plate 43 mounted on the wall 11 and is operatively connected to the shaft 40 for rotating said shaft and blower impellers 35. The walls 11 and 12 and partitions 22 and 23 are provided with aligned fresh air intake openings 46 and 47 whereby fresh air can enter the chamber 24. While the drum 3 may be driven from a motor independently of the motor 6, in the illustrated structure, the shaft 40 extends into a gear housing 48 mounted on the cover plate 43 on the wall 12. A gear 49 is fixed on the shaft 40 and meshes with a gear 50 fixed on a shaft 51, one end of which is rotatably mounted in a bearing aperture 52 in the housing 48 and the other end rotatably mounted in a sleeve 53 suitably fixed in said housing 48. The sleeve 53 preferably extends through an opening 54 in one of the walls of the gear housing and is suitably fixed therein as by screw threads, the shaft 51 terminating short of the end of the sleeve.

A flexible shaft 55 is arranged in a housing 56 with one end of the housing connected to an end 57 of a sleeve 58, the other end of said sleeve preferably being provided with a flange 59 which is held in engagement with the end of the sleeve 53 by means of a nut 60 threaded thereon whereby said sleeves are coaxial. An end of the flexible shaft 55 is fixed to a clutch member 61 slidably mounted in the bores of the sleeves 58 and 53 and having a lug 62 engageable in a recess 63 in the end of the shaft 51 to effect a driving engagement therebetween. The clutch member 61 is moved to effect driving engagement with the shaft 51 or for disengagement therefrom by means of a collar 64 slidably mounted on the sleeve 58, said collar having a lug 65 extending through a slot 66 in the sleeve 58 whereby said lug engages a flange 67 on the clutch member 61. The collar is operatively connected to a control member such as a rod 68 which is movable to shift the collar and clutch member for selective rotation of the drum 3. The rod 68 may extend to a passenger compartment to be cooled whereby it is convenient to the person therein for control of operation of the drum 3. The other end of the flexible shaft and housing 56 extend through an aperture 69 in the wall 12 with said other end of the housing secured to an extension 70 on a bushing 71 fixed in the partition 23, said bushing having a bore 72 rotatably mounting a shaft 73 carrying one of the rollers 26. The shaft 73 is connected by a flexible coupling such as a coiled spring 74 to the adjacent end of the flexible shaft 55. The spring 74 also applies pressure on the shaft 55 to urge the engagement of the clutch member 61 and shaft 51.

In operating an evaporative cooler constructed and assembled as described for cooling the passenger compartment of a vehicle, the casing 1 is preferably arranged in the trunk or other compartment of the vehicle and the ducts 7 and 8 arranged whereby they have communication with the passenger compartment to be cooled. The motor 6 is connected to the electrical system with suitable switches or the like for control of the circuit thereto and the rod 68 extended into the passenger compartment for convenience of operation. Then the cap 15 is removed and liquid or water delivered to the interior of the casing 2 to fill same to the desired level as indicated by the level indicator rod 20. Then when it is desired to circulate air in the passenger compartment, the motor 6 is energized to drive the blower impellers 35 and operation of the blowers draws air from the compartment to be cooled through the ducts 7 into the chamber 24 and then through the porous padlike wall 29 of the drum 3, through the tubular members 38 into the blower housings, said air then being discharged through the ducts 37 and ducts 8 to the passenger compartment. During this operation some fresh air is drawn through the apertures 46 and 47 into the chamber 24 for mixture with the air drawn from the passenger compartment. When cooling of the air is desired, in addition to the circulation thereof, the clutch rod 68 is moved to slide the collar 64 on the sleeve 58 to move the clutch member 61 into operative engagement with the end of the shaft 51. Then operation of the motor 6 drives the blowers and also through the gears 49 and 50 drives the shaft 51, clutch member 61, flexible shaft 55 and the rollers 26 connected thereto, which in turn frictionally drives the drum 3 to rotate same. Since the lower portion of the drum is in the liquid in the bottom of the chamber 24 the absorbing padlike wall 29 will be wet as it moves through said liquid. Then the air drawn through the duct 7 will pass through the absorbent material of the wall 29 and evaporate some of the liquid therein cooling the air and the blowers will then deliver the cooled air to the passenger compartment being cooled. The fresh air entering the casing 2 also is drawn through the wall 29 and is cooled. The arrangement of the blower intakes whereby they extend into the interior of the drum 3 for a substantial distance tends to cause the air to pass through the wall 29 and not around the ends of the drum thereby assuring substantially all of the air passing through the wetted absorbent material for cooling same by evaporation.

If only circulation of the air is desired as when the temperature in the passenger compartment becomes less than desired, the rod 68 is operated to disengage the clutch member 61 from the shaft 51 to permit the drum 3 to stop rotation. The upper portion of the drum wall 29 is dried by the air passing therethrough and then there will be reduced evaporation of the liquid.

It is believed obvious I have provided an evaporative cooler that is economical to manufacture and operate and that is efficient in operation for selective cooling and circulation of air to provide a comfortable condition in a passenger compartment of a vehicle or the like.

What I claim and desire to secure by Letters Patent is:

1. An evaporative cooler comprising, a casing having spaced walls defining a chamber adapted to contain a quantity of liquid in the lower portion thereof, a hollow cylindrical open-ended drum in the chamber with the drum ends spaced only slightly from opposed walls of said chamber, said drum having a cylindrical porous wall of absorbent material, means rotatably supporting said drum in the chamber in a position immersing the lower portion of the drum in the liquid contained in the lower portion of the casing chamber, air moving means arranged exteriorly of the spaced walls defining the chamber and having inlet ducts each extending through said opposed walls and into the open ends of the hollow drum for a distance substantially one-fourth the length of the drum and an outlet duct communicating with the compartment to be cooled, ducts communicating the compartment to be cooled with the chamber exteriorly of the periphery of the drum, and means rotating the drum and operating the air moving means whereby the lower portion of the drum moves through the liquid in the lower portion of the casing to wet the absorbent material on said drum and air is drawn through the ducts from the compartment to be cooled to the chamber and through the absorbent material and cooled by evaporation of the liquid therein and is then delivered by the air moving means to the compartment to be cooled.

2. An evaporative cooler comprising, a casing having spaced walls defining a chamber adapted to contain a quantity of liquid within the lower portion thereof, a hollow open-ended drum in the chamber with the drum ends spaced only slightly from opposed walls of said chamber, said drum having a cylindrical porous wall of absorbent material, means rotatably engaging said drum to support same in the chamber in a position immersing the lower portion of the drum in the liquid contained in the lower portion of the casing chamber, air moving means including rotative impellers exteriorly of the spaced walls defining the casing chamber, said air moving means having inlet ducts extending extending through said opposed walls and into the open ends of the drum for a distance substantially one-fourth the length of the drum and outlet ducts communicating with a compartment to be cooled, motor means operatively connected with the impellers for driving same, means selectively operable to rotate said drum for effecting movement of the absorbent material thereof through the liquid, and ducts communicating the compartment to be cooled with the casing chamber exteriorly of the periphery of the drum whereby operation of the motor means rotates the impellers and draws air from the compartment to be cooled through said ducts into the chamber and through the absorbent material for cooling said air by evaporation and delivers the cooled air to the compartment to be cooled.

3. An evaporative cooler comprising, a casing having spaced walls defining a chamber adapted to contain a quantity of liquid within the lower portion thereof, a hollow open-ended drum in the chamber with the drum ends spaced only slightly from opposed walls of said chamber, said drum having a cylindrical porous wall of absorbent material, a plurality of rollers rotatably mounted on said opposed walls and rotatably engaging the open ends of said drums to support said drum in the chamber in a position immersing the lower portion of the drum in the liquid contained in the lower portion of the casing chamber, air moving means including rotative impellers exteriorly of the opposed walls adjacent the ends of the drum, said air moving means having inlet ducts each extending through said opposed walls and into the open ends of the drum for a distance substantially one-fourth the length of said drum and outlet ducts communicating with a compartment to be cooled, a shaft extending through the drum and operatively connected with the impellers, motor means operatively connected with the shaft for driving the impellers, means selectively operable from the shaft for rotating said drum and effecting movement of the absorbent material thereof through the liquid, and ducts communicating the compartment to be cooled with the casing chamber exteriorly of the periphery of the drum whereby operation of the motor means rotates the impellers and draws air from the compartment to be cooled through said ducts into the chamber and through the absorbent material for cooling said air by evaporation and delivers the cooled air to the compartment to be cooled.

4. An evaporative cooler comprising, a casing having spaced walls defining a chamber adapted to contain a quantity of liquid within the lower portion thereof, a hollow open-ended drum in the chamber with the drum ends adjacent opposed walls of said chamber, said drum having a ring member at each of the drum ends and a cylindrical porous wall of absorbent material between said ring members, a plurality of rollers rotatably mounted on said opposed walls and rotatably engaging the inner surface of the ring members at the open ends of said drum to support said drum in the chamber in a position immersing the lower portion of the drum in the liquid contained in the lower portion of the casing chamber, selected walls of the casing having air inlet openings communicating with the casing chamber exteriorly of the drum, air moving means including blowers supported exteriorly of said opposed walls of the chamber, said blowers having inlet openings, ducts having communication with the blower inlet openings and each extending from said opposed casing walls into the open ends of the drum for a distance substantially one-fourth the length of the drum and in spaced relation to the inner periphery thereof and outlet ducts communicating with a compartment to be cooled, a shaft extending through the drum and operatively connected with the blowers, motor means operatively connected with the shaft for driving the blowers, a speed reduction means operatively connected to the blower shaft and having an output shaft, means selectively connecting the output shaft of the speed reducing means to one of the rollers supporting the drum for driving and effecting rotation of said drum moving the absorbent material thereof through the liquid, and ducts communicating the compartment to be cooled with the casing chamber exteriorly of the drum periphery whereby operation of the motor means rotates the blowers and draws air through said ducts into the chamber and through the absorbent material for cooling said air by evaporation and delivers the cooled air to the compartment to be cooled.

References Cited in the file of this patent
UNITED STATES PATENTS

| | | |
|---|---|---|
| 2,219,029 | Black | Oct. 22, 1940 |
| 2,289,825 | Burton et al. | July 14, 1942 |
| 2,300,580 | Loprich | Nov. 3, 1942 |
| 2,324,386 | Gusy | July 13, 1943 |
| 2,417,010 | Mobley | Mar. 4, 1944 |
| 2,527,569 | Pennington | Oct. 31, 1950 |